(12) United States Patent
Terashima et al.

(10) Patent No.: US 8,861,178 B2
(45) Date of Patent: Oct. 14, 2014

(54) FILM CAPACITOR ELEMENT, FILM CAPACITOR, AND METHOD OF PRODUCING THE FILM CAPACITOR ELEMENT

(71) Applicant: Kojima Press Industry Co., Ltd., Toyota (JP)

(72) Inventors: Akito Terashima, Toyota (JP); Munetaka Hayakawa, Toyota (JP); Kaoru Ito, Toyota (JP)

(73) Assignee: Kojima Press Industry Co., Ltd., Toyota-Shi (JP)

( * ) Notice: Subject to any disclaimer, the term of this patent is extended or adjusted under 35 U.S.C. 154(b) by 53 days.

(21) Appl. No.: 13/778,456

(22) Filed: Feb. 27, 2013

(65) Prior Publication Data

US 2013/0314839 A1    Nov. 28, 2013

(30) Foreign Application Priority Data

May 25, 2012   (JP) ................... 2012-119117

(51) Int. Cl.
    *H01G 4/06*     (2006.01)
    *H01G 4/33*     (2006.01)
    *H01G 4/14*     (2006.01)
    *H01G 4/30*     (2006.01)
    *H01G 4/232*    (2006.01)

(52) U.S. Cl.
    CPC . *H01G 4/30* (2013.01); *H01G 4/33* (2013.01); *H01G 4/145* (2013.01); *H01G 4/306* (2013.01); *H01G 4/232* (2013.01)

USPC ............... 361/311; 361/301.2; 361/301.4; 361/313; 361/304; 361/305

(58) Field of Classification Search
    USPC ........ 361/311, 301.2, 301.4, 301.5, 303, 304, 361/305, 312–313, 321.1, 306.1
    See application file for complete search history.

(56) References Cited

U.S. PATENT DOCUMENTS

| 5,043,843 A | 8/1991 | Kimura et al. |
| 6,104,597 A * | 8/2000 | Konushi et al. ............ 361/301.4 |

(Continued)

FOREIGN PATENT DOCUMENTS

| JP | 02-222129 A1 | 9/1990 |
| JP | 02-285618 A1 | 11/1990 |

(Continued)

OTHER PUBLICATIONS

Extended European Search Report (Application No. 13159246.1) dated Sep. 26, 2013.

*Primary Examiner* — Nguyen T Ha
(74) *Attorney, Agent, or Firm* — Burr & Brown, PLLC

(57) ABSTRACT

A film capacitor element including a base dielectric film layer 12, a vapor-deposition metal film layer 14 formed on the base dielectric film layer 12 and consisting of a first film portion 20 and a second film portion 22 that are spaced apart from each other by a margin portion 18, and a dielectric covering film layer 16 which is formed integrally on the second film portion 22 by vapor-deposition polymerization or coating and which has a covering portion 30 which fills the margin portion 18 and covers an entire area of an end face of the second film portion 22 on the side of the margin portion 18. The first film portion 20 including a non-covered portion 34 which is not covered by the dielectric covering film layer 16.

12 Claims, 8 Drawing Sheets

(56) References Cited

U.S. PATENT DOCUMENTS

| | | |
|---|---|---|
| 7,196,898 B2 * | 3/2007 | Osaka et al. ............... 361/321.1 |
| 7,529,076 B2 * | 5/2009 | Saito et al. ................. 361/301.5 |
| 7,580,241 B2 * | 8/2009 | Sakashita ...................... 361/313 |
| 7,778,009 B2 * | 8/2010 | Shioga et al. .............. 361/306.1 |
| 8,564,929 B2 * | 10/2013 | Ito et al. ..................... 361/301.4 |
| 2010/0226065 A1 | 9/2010 | Fujii et al. |
| 2011/0032656 A1 | 2/2011 | Ito et al. |
| 2012/0033342 A1 | 2/2012 | Ito et al. |

FOREIGN PATENT DOCUMENTS

| | | |
|---|---|---|
| JP | 03-201421 A1 | 9/1991 |
| JP | 04-123413 A1 | 4/1992 |
| JP | 10-208972 A1 | 8/1998 |
| JP | 2008-091605 A1 | 4/2008 |
| JP | 2008-294431 A1 | 12/2008 |
| JP | 2011-061191 A1 | 3/2011 |

* cited by examiner

FILM CAPACITOR ELEMENT, FILM CAPACITOR, AND METHOD OF PRODUCING THE FILM CAPACITOR ELEMENT

The present application is based on Japanese Patent Application No. 2012-119117 filed on May 25, 2012 the contents of which are incorporated herein by reference.

BACKGROUND OF THE INVENTION

1. Field of the Invention

The present invention relates generally to a film capacitor element, a film capacitor, and a method of producing the film capacitor element, more particularly, to a film capacitor element including a vapor-deposition metal film layer and a dielectric covering film layer integrally formed by vapor-deposition polymerization or coating on at least one of the opposite major surfaces of a base dielectric film layer, a method of advantageously producing the film capacitor element, and a film capacitor obtained by using the film capacitor element or elements.

2. Discussion of Related Art

Conventionally, film capacitors are used in various kinds of electric devices. There are two types of film capacitor: a laminar film capacitor and a wound type film capacitor. JP-A-10-208972 discloses an example of a laminar film capacitor which is obtained by laminating a plurality of metallized films each including a dielectric film layer formed of a resin film, and a vapor-deposition metal film layer as an electrode film formed on one surface of the dielectric film layer. JP-A-2008-91605 discloses an example of a wound type film capacitor which is obtained by laminating and winding a plurality of the above-described metallized films.

Electric devices are now increasingly required to have a smaller size and higher performance. Along with this requirement, film capacitors are also increasingly required to have a smaller size and higher capacity.

JP-A-2011-61191 discloses an example of a film capacitor which can meet such a requirement and which can be obtained by using a film capacitor element including a base dielectric film layer formed of a resin film and the like, a vapor-deposition metal film layer formed on at least one of the opposite major surfaces of the base dielectric film layer, and a dielectric covering film layer which is formed of a vapor-deposition polymer film and integrally formed on the vapor-deposition metal film layer. A laminar film capacitor is obtained by laminating a plurality of film capacitor elements having the above-described structure and by forming external electrodes on the opposite end faces of the film capacitor. A wound type film capacitor is obtained by winding the film capacitor element or film capacitor elements laminated on each other, and by forming external electrodes on the opposite end faces of the film capacitor.

In both of the laminar film capacitor and the wound type film capacitor, the dielectric covering film layer is formed of a vapor-deposition polymer film, which is integrally formed on the vapor-deposition metal film layer. Therefore, the dielectric covering film layer has an extremely smaller and more uniform thickness than a dielectric covering film layer formed of a resin film. Accordingly, the entire film capacitor element has an extremely smaller and more uniform thickness, and impurities contained in the dielectric covering film layer are sufficiently reduced. Thus, it is possible to advantageously obtain a film capacitor having a smaller size and higher capacity while maintaining a sufficiently high withstand voltage.

A recent advancement of coating techniques makes it possible to form a dielectric coating film having a sufficiently reduced thickness. By integrally forming the dielectric covering film layer formed of the dielectric coating film on the vapor-deposition metal film layer of the film capacitor element, it is possible to obtain a film capacitor having a smaller size and a higher capacity.

In the film capacitor element of the above-indicated publication JP-A-2011-61191, a covering portion is formed in a margin portion formed in an end portion of the base dielectric film layer. The covering portion is integrally formed of the dielectric covering film layer which consists of a dielectric film that covers the end face of the vapor-deposition metal film layer on the side of the margin portion and a corner defined by the above-indicated end face and a portion of the surface of the vapor-deposition metal film layer on which the dielectric covering film layer is formed. As a result, the vapor-deposition metal film layer, which is formed as an internal electrode in the film capacitor element, in contact with one of a pair of external electrodes formed on respective opposite end faces of the wound or laminar film capacitor element, can be stably prevented from contacting with the other external electrode.

However, when the covering portion which consists of a part of the dielectric covering film layer is formed in the margin portion, the following problems are encountered.

In a film capacitor, which is obtained by laminating a plurality of metallized films or winding the obtained laminar body, rather than by using film capacitor elements each including the dielectric covering film layer consisting of a vapor-deposition polymer film or the dielectric coating film, a gap is formed in each margin portion, which is formed between the adjacent metallized films. A portion of the external electrode extends into the gap so as to increase the adhesiveness of the external electrode to the corresponding end face of the film capacitor. However, when a covering portion consisting of the dielectric covering film layer is integrally formed in the margin portion, no gap is formed in the margin portion into which a portion of the external electrode can extend, making it difficult to increase the adhesiveness of the external electrode to the end face of the film capacitor.

In order to overcome this problem, it is considered to form a margin portion having a larger width than the covering portion, thereby forming a gap in the margin portion on one side of the covering portion, so that a portion of the external electrode can extend into the gap. However, in such a case, the following problem is encountered.

In order to form the margin portion having a larger width, it is required that before the vapor-deposition metal film layer is formed on the base dielectric film layer, an oil layer is formed in an end portion of the base dielectric film layer over a large width to prevent the vapor-deposition metal film layer from adhering to the base dielectric film layer. Accordingly, the required amount of oil adhering to the end portion of the base dielectric film layer increases, giving rise to a risk that the oil adheres to the dielectric covering film layer while the film capacitor element is taken up onto or fed from a reel, and adversely affects the dielectric covering film layer. Further, an excessive amount of oil adhering to the dielectric covering film layer increases a possibility that the dielectric covering film layer peels off from the vapor-deposition metal film layer.

SUMMARY OF THE INVENTION

The present invention was made in view of the background art described above. It is therefore a first object of the present invention to provide a film capacitor element which is configured to stably prevent contact of its vapor-deposition metal film layer with both of two external electrodes respectively formed on its opposite end faces, and which assures an effectively increased degree of adhesiveness of the external electrodes to its end faces, without an adverse influence of an oil used to form a margin portion therein. It is a second object of the present invention to provide a method suitable for producing the film capacitor element. It is a third object of the present invention to provide a film capacitor which is configured to stably prevent contact of its vapor-deposition metal film layer with both of the two external electrodes respectively formed on its opposite end faces, and which assures an effectively increased degree of adhesiveness of the external electrodes to its end faces, without an adverse influence of the oil used to form the margin portion.

The first object indicated above can be achieved according to a first aspect of this invention, which provides a film capacitor element comprising a base dielectric film layer, a vapor-deposition metal film layer formed on at least one of opposite major surfaces of the base dielectric film layer, and a dielectric covering film layer formed integrally on the vapor-deposition metal film layer, by vapor-deposition polymerization or coating, characterized in that: a margin portion in which the vapor-deposition metal film layer is not formed is provided in a part of an end portion of the major surface of the base dielectric film layer, which part is spaced inwardly from an end face of the base dielectric film layer, the margin portion extending along the end face and dividing the vapor-deposition metal film layer into a first film portion and a second film portion such that the first and second film portions are positioned on respective opposite sides of the margin portion, the first film portion extending along the end face of the base dielectric film layer, while the second film portion being spaced apart from the first film portion by the margin portion; the dielectric covering film layer is integrally formed on the second film portion and in the margin portion, by vapor-deposition polymerization or coating, and includes a covering portion which fills the margin portion and covers an entire area of an end face of the second film portion on the side of the margin portion; and the first film portion includes a first non-covered portion which is not covered by the dielectric covering film layer.

According to one preferred form of the above-described first aspect of the invention, the vapor-deposition metal film layer and the dielectric covering film layer are laminated on each of the opposite major surfaces of the base dielectric film layer such that the margin portion is provided in one of opposite end portions of one of the opposite major surfaces of the base dielectric film layer, and in one of opposite end portions of the other of the opposite major surfaces, which one end portion of the other major surface corresponds to the other of the opposite end portions of the one major surface, and such that the covering portion of the dielectric covering film layer provided on each of the opposite major surfaces of the base dielectric film layer fills the margin portion provided on each of the opposite major surfaces, the first film portion of the vapor-deposition metal film layer being formed on the one of the opposite end portions of the one major surface of the base dielectric film layer, and on the one of the opposite end portions of the other major surface, such that the first film portions formed on the opposite major surfaces extend along the respective opposite end faces of the base dielectric film layer, each of the first film portions including the first non-covered portion.

According to another preferred form of the first aspect of the invention, the film capacitor element further comprises an upper vapor-deposition metal film layer formed on the dielectric covering film layer in addition to the vapor-deposition metal film layer formed on one of the opposite major surfaces of the base dielectric film layer, such that the upper vapor-deposition metal film layer does not contact with the second film portion of the vapor-deposition metal film layer; and an upper margin portion in which the upper vapor-deposition metal film layer is not formed, and which is provided in a part of an end portion of the dielectric covering film layer, which end portion is remote from the covering portion, and which part is spaced inwardly from an end face of the dielectric covering film layer, the upper margin portion extending along the end face and dividing the upper vapor-deposition metal film layer into a first upper film portion and a second upper film portion, such that the first and second upper film portions are positioned on respective opposite sides of the upper margin portion, the first upper film portion extending along the end face of the dielectric covering film layer, while the second upper film portion being spaced apart from the first upper film portion by the upper margin portion.

According to a further preferred form of the first aspect of the invention, the vapor-deposition metal film layer and the dielectric covering film layer are laminated on one of the opposite major surfaces of the base dielectric film layer, while a lower vapor-deposition metal film layer is formed on the other of the opposite major surfaces of the base dielectric film layer in addition to the vapor-deposition metal film layer formed on one of the opposite major surfaces of the base dielectric film layer, such that the lower vapor-deposition metal film layer does not contact with the vapor-deposition metal film layer, and wherein a lower margin portion in which the lower vapor-deposition metal film layer is not formed is provided in a part of one of opposite end portions of the other major surface of the base dielectric film layer, which one end portion corresponds to one end portion of the one major surface of the base dielectric layer remote from the margin portion, and which part is spaced inwardly from an end face of the base dielectric film layer, the lower margin portion extending along the end face and dividing the lower vapor-deposition metal film layer into a first lower film portion and a second lower film portion, such that the first and second lower film portions are positioned on respective opposite sides of the lower margin portion, the first lower film portion extending along the end face of the base dielectric film layer, while the second lower film portion being spaced apart from the first lower film portion by the lower margin portion.

According to a further preferred form of the first aspect of the invention, the second film portion includes a second non-covered portion in one of opposite end portions thereof which is remote from the margin portion, the second non-covered portion being not covered by the dielectric covering film layer.

According to a further preferred form of the first aspect of the invention, the second non-covered portion of the second film portion is defined as a thick edge portion having a larger thickness than a portion of the second film portion other than the second non-covered portion.

According to a further preferred form of the first aspect of the invention, an auxiliary vapor-deposition metal film layer is formed on the second non-covered portion of the second film portion such that the second non-covered portion is defined as the above-described thick edge portion.

According to a further preferred form of the first aspect of the invention, the dielectric covering film layer is formed on an end portion of the first film portion on the side of the margin portion so as to cover the end portion, whereby a covered portion which is covered by the dielectric covering film layer is provided on the end portion of the first film portion.

According to a further preferred form of the first aspect of the invention, the dielectric covering film layer has a higher relative dielectric constant than the base dielectric film layer.

According to a further preferred form of the first aspect of the invention, the dielectric covering film layer comprises a vapor-deposition polymer film layer formed of a polyurea resin.

According to a further preferred form of the first aspect of the invention, the dielectric covering film layer is formed on the second film portion and in the margin portion so as to have a laminar structure consisting of a plurality of vapor-deposition polymer films formed of the same kind of material.

The third object indicated above can be achieved according to a second aspect of this invention, which provides a film capacitor comprising a laminar or wound body obtained by using film capacitor elements configured according to the first aspect of the invention, and two external electrodes formed on respective opposite end faces of the laminar or wound body, and wherein a gap is formed between the non-covered portion of the first film portion of the vapor-deposition metal film layer of one of two adjacent ones of the film capacitor elements, and an end portion of the other of the two adjacent film capacitor elements, which end portion is opposed to the non-covered portion, a portion of each of the two external electrodes functioning as a filler portion which fills the gap.

The second object indicated above can be achieved according to a third aspect of the present invention, which provides a method of producing a film capacitor element comprising a base dielectric film layer, a vapor-deposition metal film layer formed on at least one of opposite major surfaces of the base dielectric film layer, and a dielectric covering film layer formed integrally on the vapor-deposition metal film layer, by vapor-deposition polymerization or coating, the method comprising the steps of: providing the base dielectric film layer; forming an oil layer having a predetermined width, in an end portion of at least one of the opposite major surfaces of the base dielectric film layer such that the oil layer is inwardly spaced from one of opposite side edges of the base dielectric film layer and extends along the one side edge; subjecting the major surface of the base dielectric film layer on which the oil layer has been formed, to vapor deposition of a metal, (i) to provide a margin portion in which the vapor-deposition metal film layer is not formed, in the end portion of the major surface where the oil layer has been formed, (ii) to form a first film portion of the vapor-deposition metal film layer in an extreme end portion of the major surface on the side of the margin portion, which extreme end portion is not covered by the oil layer, such that the first film portion extends along the one of the opposite side edges of the base dielectric film layer, and (iii) to form a second film portion of the vapor-deposition metal film layer in the remaining portion of the major surface which is spaced by the margin portion from the extreme end portion, whereby the vapor-deposition metal film layer including the first and second film portions is formed on the major surface; and forming integrally the dielectric covering film layer on the second film portion of the vapor-deposition metal film layer and in the margin portion, by vapor-deposition polymerization or coating, such that an end portion of the dielectric covering film layer on the side of the margin portion functions as a covering portion which covers an entire area of an end face of the second film portion on the side of the margin portion, while the dielectric covering film layer is not formed on the first film portion of the vapor-deposition metal film layer, whereby a non-covered portion which is not covered by the dielectric covering film layer is provided on the first film portion.

According to a preferred form of the third aspect of the invention, the step of forming the dielectric covering film layer on the second film portion and in the margin portion is performed a plurality of times by using the same kind of material such that the dielectric covering film layer has a laminar structure consisting of a plurality of vapor-deposition polymer films formed of the same kind of material.

In the film capacitor element according to the first aspect of the invention described above, the covering portion of the dielectric covering film layer fills the margin portion and covers the entire area of the end face of the second film portion of the vapor-deposition metal film layer on the side of the margin portion. In a film capacitor produced by using the film capacitor element constructed as described above, the second film portion includes an end portion which has an end face partially defining the margin portion and which also has a corner edge defined by the end face and a surface of the second film portion on which the dielectric covering film layer is formed. The film capacitor has two external electrodes formed on respective end faces thereof. The provision of the margin portion in the film capacitor element makes it possible to stably prevent the above-indicated end portion of the second film portion of the vapor-deposition metal film layer from contacting the external electrode formed on the end face of the film capacitor on the side of the margin portion.

The film capacitor element according to the first aspect of the invention is further configured such that the first and second film portions of the vapor-deposition metal film layer are formed on the respective two parts of the major surface of the base dielectric film layer which are positioned on the respective opposite sides of the margin portion and which are spaced apart form each other by the margin portion. The first film portion formed on the end portion of the base dielectric film layer on the side of the margin portion extends along the end face of this end portion, and includes the first non-covered portion which is not covered by the dielectric covering film layer. In the film capacitor produced by laminating or superposing a plurality of film capacitor elements of the invention on each other, or by winding a laminar body consisting of the film capacitor elements laminated on each other, a gap is formed between the first non-covered portion of the first film portion of the vapor-deposition metal film layer of one of the two adjacent film capacitor elements and the corresponding end portion of the other of the two adjacent film capacitor elements. This gap has a thickness equal to that of the dielectric covering film layer and is open laterally outwardly at a corresponding one of opposite end faces of the film capacitor. Accordingly, each of the external electrodes formed on the opposite end faces of the film capacitor partially extends into the corresponding gap formed between the end portions of the two adjacent film capacitor elements, thereby filling the gap and effectively improving the adhesiveness of the external electrodes to the end faces of the film capacitor.

The present film capacitor element is also configured such that the margin portion is provided in only a part of the end portion of the base dielectric film layer which is spaced inwardly from the end face of the base dielectric film layer, and the first film portion of the vapor-deposition metal film layer is formed in an extreme end portion of the base dielectric film layer such that the first film portion partially defines the gap which is filled by a part of a corresponding one of the two external electrodes in the production of the film capacitor. Namely, the width of the margin portion is minimized to permit formation of the first film portion having a width sufficient to partially define the gap filled by the external electrode. Accordingly, the amount of the oil required to form the margin portion is limited to a value almost equal to an amount required in the production of a conventional film capacitor element, so that the present film capacitor element is effectively prevented from suffering from various defects due to the use of an excessively large amount of oil.

Thus, the film capacitor element according to the first aspect of this invention is stably prevented from suffering from contact of its vapor-deposition metal film layer with both of the two external electrodes and an adverse influence of the oil used to form the margin portion, so that the film capacitor element permits production of the film capacitor in which the adhesiveness of the external electrodes to the film capacitor element is effectively increased.

Accordingly, the film capacitor according to the second aspect of this invention is stably prevented from suffering from contact of its vapor-deposition metal film layer with both of the two external electrodes and an adverse influence of the oil used to form the margin portion, so that the adhesiveness of the external electrodes of the film capacitor to the film capacitor element is effectively increased.

According to the method of producing the film capacitor element according to the third aspect of this invention, the film capacitor element having the excellent characteristics described above can be advantageously produced with an extremely high degree of stability.

BRIEF DESCRIPTION OF THE DRAWINGS

The above and other objects, features, advantages of the present invention will be better understood by reading the following detailed description of preferred embodiments of the present invention, when considered in connection with the accompanying drawings, in which.

DETAILED DESCRIPTION OF THE INVENTION

To further clarify the present invention, there will be described in detail embodiments of the present invention by reference to the accompanying drawings.

Figure 1:
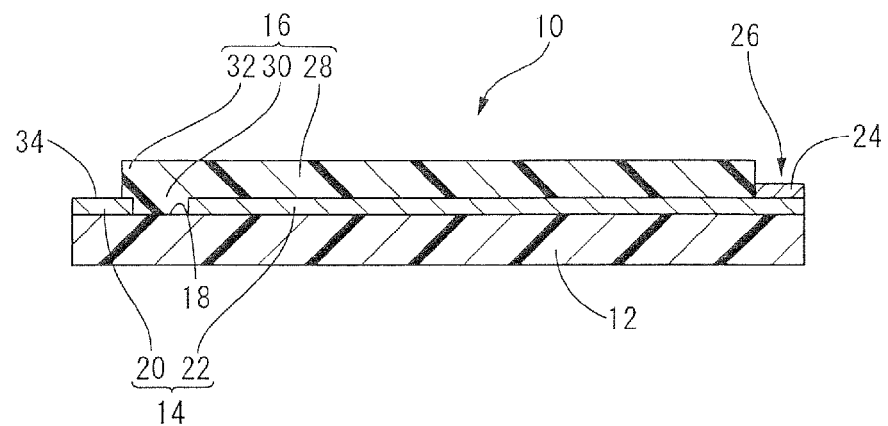
FIG. 1 is a schematic transverse cross sectional view showing one example of a film capacitor element constructed according to one embodiment of the present invention.

FIG. 1 shows a film capacitor element 10 constructed according to one embodiment of the present invention in transverse cross section. As shown in FIG. 1, the film capacitor element 10 of the present embodiment has a resin film 12 as a base dielectric film layer, a vapor-deposition metal film 14 as a vapor-deposition metal film layer formed on one of opposite major surfaces of the resin film 12 in the thickness direction, and a vapor-deposition polymer film 16 as a dielectric covering film layer formed on a surface of the vapor-deposition metal film 14 remote from the resin film 12. Namely, the film capacitor element 10 of the present embodiment has a basic structure including a base dielectric film layer (resin film 12), a vapor-deposition metal film layer (vapor-deposition metal film 14), and a dielectric covering film layer (vapor-deposition polymer film 16), which are laminated in this order of description.

Described more specifically, the resin film 12 is formed of a biaxially stretched film made of polypropylene and has a small thickness of about 1-10 μm. The resin film 12 may be any known resin film that can constitute a dielectric film layer in a conventional film capacitor. The resin film may be made of polyethylene terephthalate, polyphenylene sulfide, or polyethylene naphthalate, for example. The resin film is not necessarily formed of a biaxially stretched film.

The vapor-deposition metal film 14, which is formed on one of the opposite major surfaces of the resin film 12 as described above, is not formed in an end portion of the resin film 12, which end portion is spaced from one of opposite end faces (left end face in FIG. 1) of the resin film 12 by a predetermined distance in the width direction (horizontal direction in FIG. 1). The end portion where the vapor-deposition metal film 14 is not formed is defined as a margin portion 18. Namely, the margin portion 18 is provided in a part of the surface of the resin film 12 (on which the vapor-deposition metal film 14 is formed), which part is spaced from the center to one end face of the resin film 12 in the width direction. The margin portion 18 extends along the end face in the form of a band having a predetermined width. The width of the margin portion 18 is almost equal to a width of a margin portion provided in a conventional film capacitor element.

In the present embodiment, the vapor-deposition metal film 14, which is formed on the resin film 12, is made of aluminum. The vapor-deposition metal film 14 constitutes an internal electrode in a film capacitor produced by using the film capacitor element 10. The vapor-deposition metal film 14 is formed on one of the opposite major surfaces of the resin film 12 by a conventional process. Specifically, the vapor-deposition metal film 14 is formed by a conventional vacuum deposition process known as PVD or CVD, by using a known metal material as a deposition material that forms an internal electrode in a film capacitor. The vapor-deposition metal film 14 is not necessarily made of aluminum, but may be made of zinc, for example.

It is well known that in order to obtain a high withstand voltage characteristic in a film capacitor, it is preferable that the vapor-deposition metal film 14, which functions as an internal electrode, has a high membrane resistance. Therefore, the membrane resistance of the vapor-deposition metal film 14 is preferably about 1 to 50Ω/□. The thickness of the vapor-deposition metal film 14 is not particularly limited, but is properly selected depending on the membrane resistance of the vapor-deposition metal film 14 and the electric resistance of the metal material used for the vapor-deposition metal film 14. The membrane resistance of the vapor-deposition metal film 14 smaller than 1Ω/□ causes a risk of reduction of the withstand voltage of the film capacitor obtained by using the film capacitor element. Also, in order to obtain the vapor-deposition metal film 14 having a membrane resistance larger than 50Ω/□, the vapor-deposition metal film 14 is required to have an extremely small thickness. However, it is difficult to form such a thin vapor-deposition metal film 14 having a uniform thickness by metal vapor-deposition. Accordingly, when the vapor-deposition metal film 14 is formed so as to have a membrane resistance larger than 50Ω/□, there is a high possibility of variation in the membrane resistance of the vapor-deposition metal film 14.

In the present embodiment, the vapor-deposition metal film 14 is divided into a first film portion 20 and a second film portion 22 by the margin portion 18, which is formed in the end portion of one of the opposite major surfaces of the resin film 12. Namely, the vapor-deposition metal film 14 consists of the first film portion 20 and the second film portion 22, which are positioned on respective opposite sides of the margin portion 18 such that the first and second film portions 20, 22 do not contact with each other.

Among the first and second film portions 20 and 22, the first film portion 20 is formed in the extreme widthwise end portion of one of the opposite major surfaces of the resin film 12 (which end portion is adjacent to the margin portion 18). The first film portion 20 extends along a straight line in the form of a band having a small width. Namely, the first film portion 20 is formed in the extreme widthwise end portion of the resin film 12 over the entire length of the resin film 12 along the margin portion 18.

As described later, a portion of an external electrode, which is formed on the corresponding end face of the film capacitor by thermal spraying, is laminated on the first film portion 20 during the production of the film capacitor (see FIG. 4). Also, in the vapor-deposition metal film 14, only the second film portion 22 functions as an internal electrode, and the first film portion 20 does not function as the internal electrode. Therefore, the width of the first film portion 20 is not particularly limited, but is preferably selected to allow a part of the external electrode to be stably laminated on the first film portion 20, and to allow the resin film 12 to have a sufficient area where the second film portion 22 is formed. Specifically, the width of the first film portion 20 is almost equal to or slightly smaller than the width of the margin portion 18.

The second film portion 22 is formed so as to cover the entire area of the above-indicated one major surface of the resin film 12, except the parts where the margin portion 18 and the first film portion 20 are formed. The end face of the second film portion 22, which is remote from the margin portion 18, is flush with the corresponding end face of the resin film 12 (which is opposite to the end face on the side of the margin portion 18). This ensures stable contact of the second film portion 22 with the external electrode, which is formed on one of the opposite end faces of the film capacitor (obtained by using the film capacitor element 10), which one end face is remote from the margin portion 18, so that the second film portion 22 can stably function as the internal electrode in the film capacitor.

On an end portion of the second film portion 22 where the second film portion 22 contacts with the external electrode, an auxiliary vapor-deposition metal film 24 is formed. The auxiliary vapor-deposition metal film 24 extends along a straight line parallel to the end face of the second film portion 22 in the form of a band having a small width.

The end portion of the second film portion 22 where the second film portion 22 contacts with the external electrode is defined as a heavy edge portion, or a thick edge portion 26, which has a larger thickness than the other portion of the second film portion 22 by the thickness of the auxiliary vapor-deposition metal film 24. The thick edge portion 26 has a smaller membrane resistance than the other portion of the second film portion 22, which has a smaller thickness. Consequently, in the film capacitor obtained by using the film capacitor element 10, a contact resistance between the external electrode and the second film portion 22 functioning as the internal electrode is reduced, making it possible to advantageously reduce the dielectric dissipation factor of the film capacitor.

The material of the auxiliary vapor-deposition metal film 24 is not particularly limited, and may be the same as that of the vapor-deposition metal film 14 (the second film portion 22). In the present embodiment, the vapor-deposition metal film 14 is made of aluminum, and the auxiliary vapor-deposition metal film 24 is made of zinc. As described above, the membrane resistance of a comparatively thin area of the second film portion 22 other than an area partially defining the thick edge portion 26 is preferably about 1 to 50Ω/□. The membrane resistance of the thick edge portion 26 is selected to be smaller than this value and preferably to be within a range of 1 to 30Ω/□. The membrane resistance of the thick edge portion 26 smaller than 1Ω/□ causes an excessive amount of heat generated during the formation of the auxiliary vapor-deposition metal film 24, giving rise to a risk of thermal deformation of the resin film 12, which may cause some problems in practical use. Also, the membrane resistance of the thick edge portion 26 larger than 30Ω/□ reduces a difference between the membrane resistances of the thick edge portion 26 and the other portion of the second film portion 22. In this case, it is possible that the contact resistance between the second film portion 22 and the external electrode cannot be sufficiently reduced owing to the formation of the thick edge portion.

In the present embodiment, the vapor-deposition polymer film 16 is made of a polyurea resin film. The vapor-deposition polymer film 16 is formed on the vapor-deposition metal film 14 by a conventional vacuum vapor-deposition polymerization process so as to cover one of the opposite major surfaces of the vapor-deposition metal film 14, which is remote from the resin film 12. The vapor-deposition polymer film 16 has a high quality with a small amount of impurities having a thickness sufficiently smaller than the thickness of the resin film 12. As a result, the film capacitor obtained by using the film capacitor element 10 can have a smaller size and higher capacity.

Although the thickness of the vapor-deposition polymer film 16 is not particularly limited, it is preferably about 0.001 to 10 μm. Since it is difficult to form the vapor-deposition polymer film 16 having a thickness of less than 0.001 μm, the thickness of the vapor-deposition polymer film 16 is practically desired to be 0.001 μm or more. Further, the vapor-deposition polymer film 16 having a thickness larger than 10 µm cannot sufficiently reduce the size of the film capacitor including the vapor-deposition polymer film 16 as a dielectric film layer.

A kind of the resin of the vapor-deposition polymer film 16 is not particularly limited as long as the resin can be formed into a film by a vacuum vapor-deposition process. The vapor-deposition polymer film 16 may be formed of a polyamide resin film, a polyimide resin film, a polyamideimide resin film, a polyester resin film, a polyazomethine resin film, or a polyurethane resin film, in place of the polyurea resin film. Among the above listed resin films, one having a higher relative dielectric constant than the resin film 12 is favorably used. The static capacity of the film capacitor obtained by using the film capacitor element 10 can be effectively increased by the formation of the vapor-deposition polymer film 16 using one of these resin films.

The polyurea resin constituting the vapor-deposition polymer film 16 assures a higher relative dielectric constant than the resin film 12 and requires no heat treatment in the polymerization of material monomers (for example, diisocyanate and diamine). Further, the polyurea resin is formed in a polyaddition polymerization reaction, which is totally free from removal of by-product such as water, alcohol and the like, making it possible to eliminate the use of an apparatus for heat treatment in the polymerization of the material monomers and to reduce the cost of production of the vapor-deposition polymer film 16. Further, deformation of the resin film 12 by the heat generated during the heat treatment can be effectively avoided. Furthermore, there is no need to discharge water, alcohol and the like removed during the polymerization reaction, from a vacuum chamber in which the polymerization reaction proceeds, making it possible to eliminate the use of an apparatus for discharging the water, alcohol and the like, also resulting in the reduction of the cost. In addition, the polyurea resin has a high moisture resistance, assuring a high withstand voltage characteristic of the vapor-deposition polymer film 16.

In the present embodiment, the vapor-deposition polymer film 16 integrally includes a first covering portion 28 formed on the second film portion 22, a second covering portion 30 formed in the margin portion 18, and a third covering portion 32 formed on the first film portion 20. Among the first, second and third covering portions 28, 30 and 32, the first covering portion 28 is formed on the entire surface of the second film portion 22 remote from the resin film 12, other than the area partially defining the thick edge portion 26. Namely, a second non-covered portion which is not covered by the vapor-deposition polymer film 16 is provided on the end portion of the second film portion 22, which is remote from the margin portion 18 and which partially defines the thick edge portion 26.

The second covering portion 30 and the third covering portion 32 constitute the end portion of the vapor-deposition polymer film 16 on the side of the margin portion 18. The second covering portion 30 is formed so as to fill the margin portion 18 between the mutually opposed end faces of the first film portion 20 and the second film portion 22, which define the margin portion 18. The thickness of the second covering portion 30 is equal to a sum of the thicknesses of the first covering portion 28 and the second film portion 22 (except the thick edge portion 26). Thus, the second covering portion 30 covers the end portion of the second film portion 22 on the side of the margin portion 18, that is, the entire area of the end face of the second film portion 22 on the side of the margin portion 18 and a corner edge defined by the above-indicated end face and the surface of the second film portion 22 on which the first covering portion 28 is formed.

The third covering portion 32 is formed on a surface of the first film portion 20 remote from the resin film 12 so as to cover one end portion of this surface on the side of the margin portion 18. Thus, the end portion of the surface of the first film portion 20 on the side of the margin portion 18 is provided with a covered portion on which the vapor-deposition polymer film 16 is formed, while the vapor-deposition polymer film 16 is not formed in a part of the surface of the first film portion 20 remote from the resin film 12 other than the end portion on the side of the margin portion 18. The part of the first film portion 20 where the vapor-deposition polymer film 16 is not formed is defined as a non-covered portion 34 (first non-covered portion).

In the present embodiment, the vapor-deposition polymer film 16 is formed on the vapor-deposition metal film 14 (the first and second film portions 20 and 22) and in the margin portion 18, which are formed on the resin film 12, by performing vapor-deposition polymerization two times, using the same material monomers. Namely, the vapor-deposition polymer film 16 has a laminar structure consisting of two resin films formed of the same kind of resin material (polyurea resin films). Thus, the vapor-deposition polymer film 16 is advantageously prevented from suffering from formation of pinholes therein, thereby effectively preventing functional deterioration and various defects of the film capacitor element 10 and the film capacitor, which would be caused by the pinholes.

Figure 2:
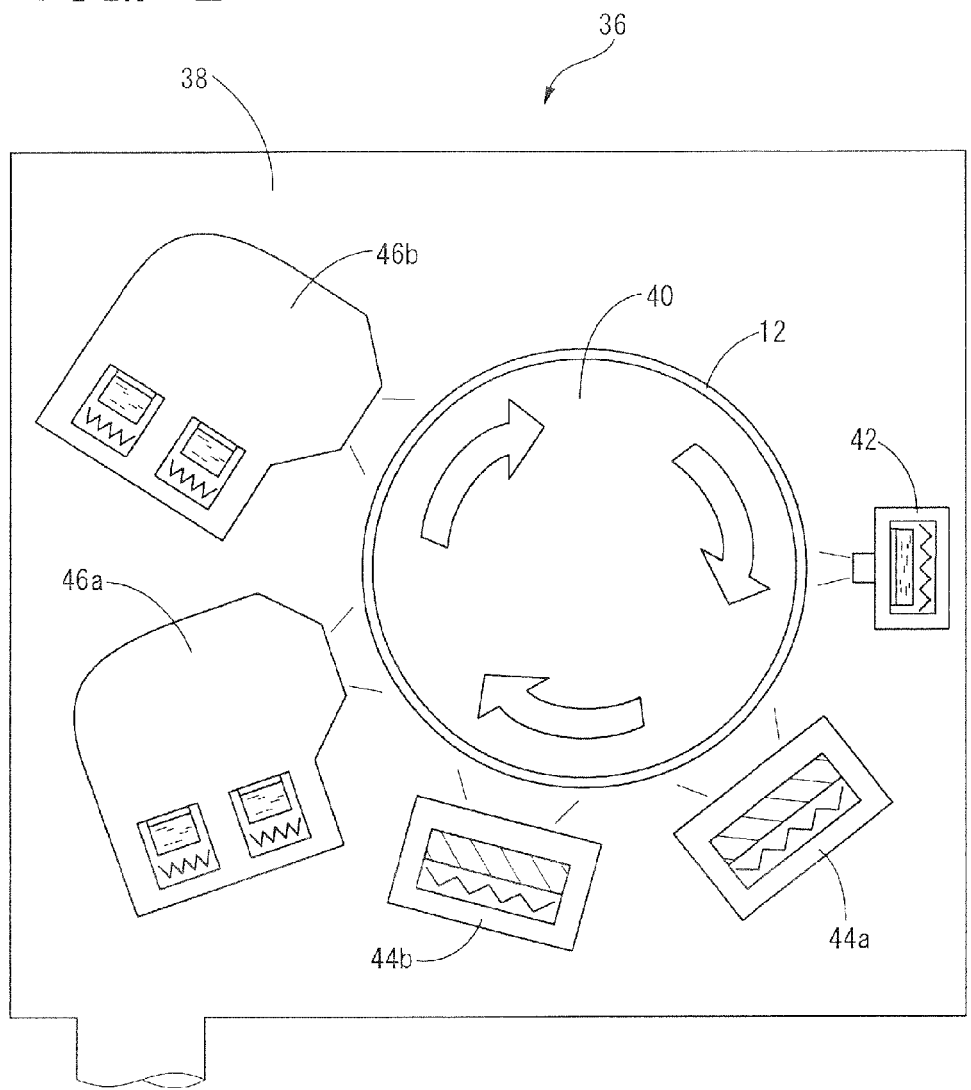
FIG. 2 is a view schematically showing an apparatus for producing the film capacitor element shown in FIG. 1.

The film capacitor element 10 of the present embodiment is produced by using a production apparatus 36, which is constructed as shown in FIG. 2, for example.

As shown in FIG. 2, the production apparatus 36 for producing the film capacitor element 10 includes a vacuum chamber 38. The inside pressure of the vacuum chamber 38 is reduced to a predetermined value by an operation of a vacuum pump (not shown), so that the vacuum chamber 38 is placed in an evacuated state. A rotary drum 40 is disposed inside the vacuum chamber 38. The rotary drum 40 is continuously driven in one direction (in the clockwise direction indicated by white arrows, in this embodiment) by a rotary drive device (not shown) such as an electric motor. The resin film 12 is wound on an outer circumferential surface of the rotary drum 40. Around the rotary drum 40 in the vacuum chamber 38, there are disposed: an oil layer forming device 42; a first metal film forming device 44a; a second metal film forming device 44b; a first polymer film forming device 46a; and a second polymer film forming device 46b, which are arranged in this order of description in the clockwise direction and spaced apart from each other in the circumferential direction of the rotary drum 40.

The oil layer forming device 42 is configured to form an oil layer in the form of a thin film (not shown) by vapor-deposition, for example, in a widthwise end portion of a surface (outer circumferential surface) of the resin film 12, which has been wound on the rotary drum 40, such that the oil layer is inwardly spaced from but relatively close to one of the opposite side edges of the resin film 12 in the width direction. It will be understood from the following description that the oil layer corresponds to the margin portion 18.

Both of the first and second metal film forming devices 44a and 44b have the same construction provided with a mechanism for heating and vaporizing certain metal materials to perform vacuum vapor-deposition. The first metal film forming device 44a is configured to heat and vaporize aluminum and perform vacuum vapor-deposition so as to form the vapor-deposition metal film 14 on a surface of the resin film 12 wound on the rotary drum 40. The second metal film forming device 44b is configured to heat and vaporize zinc and perform vacuum vapor-deposition so as to form the auxiliary vapor-deposition metal film 24 on an end portion of the vapor-deposition metal film 14. Metal elements that are heated and vaporized by the first metal film forming device 44a do not adhere to the oil layer (not shown), which has been formed on the resin film 12 by the oil layer forming device 42. Therefore, the vapor-deposition metal film 14 is not formed on the oil layer. Accordingly, as the vapor-deposition metal film 14 is formed on the surface of the resin film 12, the margin portion 18 is formed on the oil layer formed on the resin film 12. The second metal film forming device 44b forms the auxiliary vapor-deposition metal film 24 on the vapor-deposition metal film 14 formed on the resin film 12, only in the end portion of the vapor-deposition metal film 14 remote from the margin portion 18.

Both of the first and second polymer film forming devices 46a and 46b have the same construction provided with a mechanism for heating and vaporizing a plurality of material monomers. In the present embodiment, the first and second polymer film forming devices 46a, 46b are configured to heat and vaporize diisocyanate and diamine as the material monomers. The first and second polymer film forming devices 46a, 46b are operated to cause a polymerization reaction between vapors of diisocyanate and diamine to form the vapor-deposition polymer film 16 in the margin portion 18 and on the vapor-deposition metal film 14 formed on the surface of the resin film 12, which has been wound on the rotary drum 40.

In the present embodiment, an outlet from which the vapors of diisocyanate and diamine are delivered from each of the first and second polymer film forming devices 46a, 46b has a smaller width than the width of the resin film 12, for example. Accordingly, the vapors of diisocyanate and diamine blown off from the outlet do not adhere to the opposite widthwise end portions of the resin film 12, namely, the first film portion 20 except its end portion on the side of the margin portion 18, and the auxiliary vapor-deposition metal film 24.

The film capacitor element 10 can be produced by using the production apparatus 36 having the above-described construction, by the following process, for example. First, the resin film 12 is wound on the rotary drum 40, and then the vacuum chamber 38 is placed in the evacuated state. The rotary drum 40 is rotated in the direction indicated by the white arrows in FIG. 2.

After the vacuum chamber 38 is placed in the predetermined evacuated state, the oil layer forming device 42 is actuated while the rotary drum 40 is rotated. Thus, the oil layer (not shown) is continuously formed over the entire circumference of the resin film 12 so as to have a predetermined width corresponding to the width of the margin portion 18, such that the oil layer is spaced from but relatively close to one of the opposite side edges of the resin film 12 in the width direction.

The first metal film forming device 44a is actuated when the leading end of the oil layer formed on the resin film 12 for forming the margin portion 18 comes to a position opposed to the position of the first metal film forming device 44a during rotation of the rotary drum 40. As a result, the vapor-deposition metal film 14 is formed on the surface of the resin film 12. At this time, the vapor-deposition metal film 14 is not formed on the oil layer which is formed in the above-indicated end portion of the surface of the resin film 12. Thus, the margin portion 18 is formed in this end portion, which is spaced from one of the opposite end faces of the resin film 12 in the width direction. The first film portion 20 is formed in an extreme widthwise end portion of the surface of the resin film 12 on one side of the margin portion 18 continuously extending along the corresponding edge of the resin film 12. The second film portion 22 is formed in the other portion of the surface of the resin film 12 on the other side of the margin portion 18.

Successively, the second metal film forming device 44b is actuated when the leading end of the vapor-deposition metal film 14 formed on the resin film 12 comes to a position opposed to the position of the second metal film forming device 44b during further rotation of the rotary drum 40. As a result, the auxiliary vapor-deposition metal film 24 is formed in the end portion of the second film portion 22 of the vapor-deposition metal film 14 remote from the margin portion 18, such that the auxiliary vapor-deposition metal film 24 continuously extends along the corresponding edge of the resin film 12. The auxiliary vapor-deposition metal film 24 cooperates with the corresponding portion of the vapor-deposition metal film 14 to define the thick edge portion 26 having a larger thickness.

The first polymer film forming device 46a is actuated when the leading end of the auxiliary vapor-deposition metal film 24 formed on the resin film 12 comes to a position opposed to the position of the first polymer film forming device 46a during rotation of the rotary drum 40. As a result, a first layer of the vapor-deposition polymer film 16 is formed in the margin portion 18, on the end portion of the first film portion 20 on the side of the margin portion 18, and on the second film portion 22 except its end portion where the auxiliary vapor-deposition metal film 24 is formed.

The second polymer film forming device 46b is actuated when the leading end of the first layer of the vapor-deposition polymer film 16 formed on the resin film 12 comes to a position opposed to the position of the second polymer film forming device 46b during rotation of the rotary drum 40. As a result, a second layer of the vapor-deposition polymer film 16 is formed on the first layer of the vapor-deposition polymer film 16. Thus, the vapor-deposition polymer film 16 consisting of the first, second and third covering portions 28, 30 and 32 and having a laminar structure is formed in the margin portion 18, on the end portion of the first film portion 20 on the side of the margin portion 18, and on the second film portion 22 except its end portion where the auxiliary vapor-deposition metal film 24 is formed. Further, the non-covered portion 34, which is not covered by the vapor-deposition polymer film 16, is provided on the first film portion 20 except its end portion on the side of the margin portion 18.

Thus, during rotation of the rotary drum 40, the margin portion 18 and the vapor-deposition metal film 14 are formed on one of the opposite major surfaces of the resin film 12, and the vapor-deposition polymer film 16 is formed in the margin portion 18 and on the vapor-deposition metal film 14, while the thick edge portion 26 is formed on the end portion of the vapor-deposition metal film 14 remote from the margin portion 18. The film capacitor element 10 having the structure shown in FIG. 1 is thus obtained.

Figure 3:
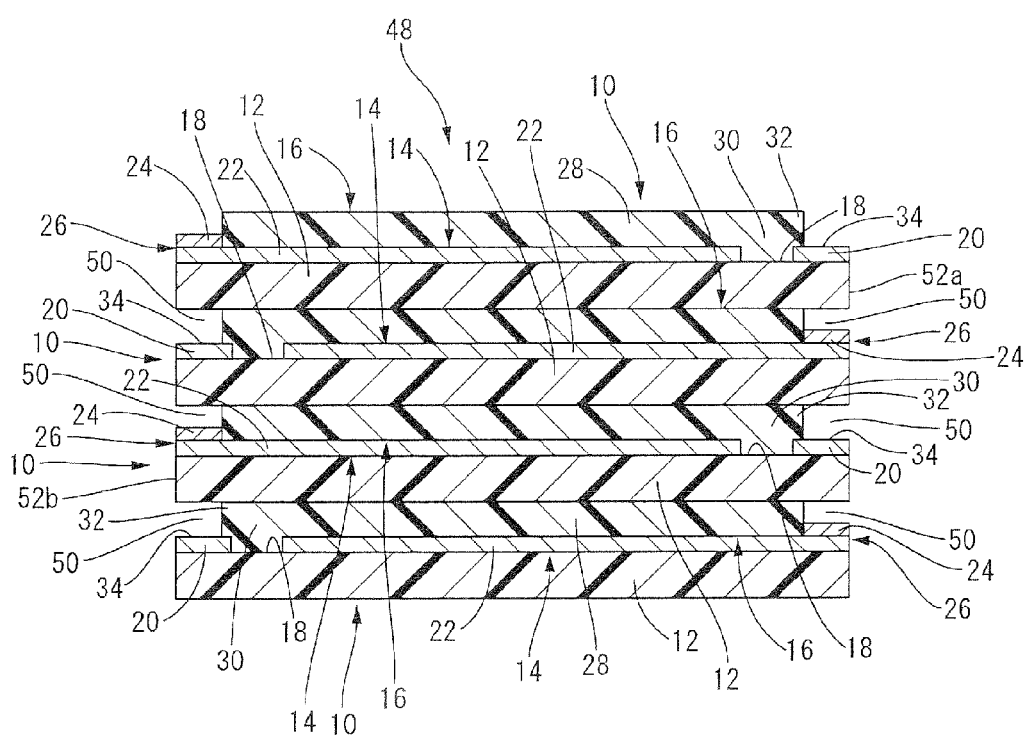
FIG. 3 is a view showing one example of a process of producing a laminar film capacitor by using the film capacitor elements each shown in FIG. 1.

In the production of a laminar film capacitor using the above-described film capacitor element 10, a plurality of film capacitor elements 10 are initially laminated to obtain a laminar body 48 as shown in FIG. 3. In the example of FIG. 3, four film capacitor elements 10 are superposed on each other.

In the laminar body 48, the film capacitor elements 10 are laminated or superposed on each other such that the vapor-deposition polymer film 16 of a lower one of the two adjacent film capacitor elements 10 and the resin film 12 of an upper one of the two adjacent film capacitor elements 10 contact with each other, and such that the margin portions 18 of the two adjacent film capacitor elements 10 are positioned at respective opposite positions as seen in the width direction of the resin film 12 (horizontal direction in FIG. 3). Thus, gaps 50 are formed in a space between the non-covered portion 34 of the first film portion 20 of the lower one of the two adjacent film capacitor elements 10 and the resin film 12 of the upper one of the two adjacent film capacitor elements 10, and in a space between the auxiliary vapor-deposition metal film 24 of the lower film capacitor element 10 and the resin film 12 of the upper film capacitor element 10. Each gap 50 is formed so as to be open laterally outwardly at a corresponding one of opposite end faces 52a, 52b of the laminar body 48.

Figure 4:
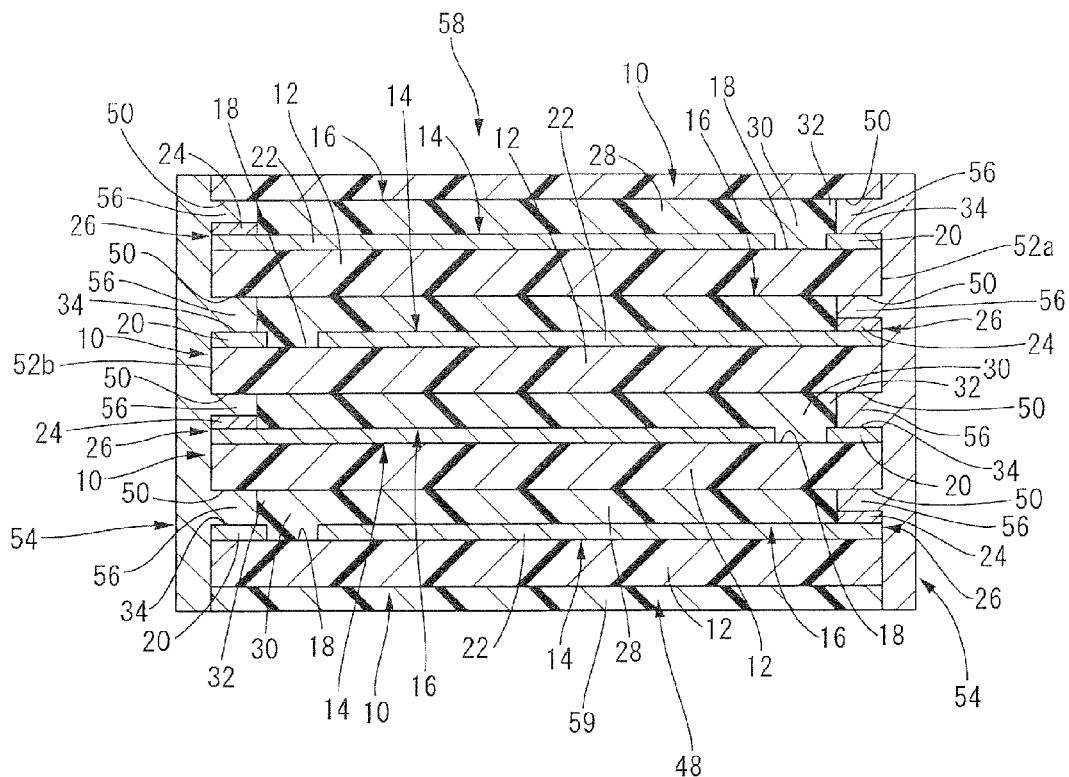
FIG. 4 is a schematic transverse cross sectional view showing the laminar film capacitor according to the present invention produced by using the film capacitor elements shown in FIG. 1.

Then, the opposite end faces 52a, 52b of the laminar body 48 at which the gaps 50 are open are coated with a metal material such as zinc with a predetermined thickness, by a conventional thermal spraying method, as shown in FIG. 4. Thus, a pair of external electrodes 54 are formed on the two respective opposite end faces 52a, 52b.

In the formation of the pair of external electrodes 54, 54, a portion of each external electrode 54 extends into the corresponding gap 50 of the laminar body 48 so as to fill the gap 50. Thus, a filler portion 56 formed of the above-indicated portion of the external electrode 54 is formed to fill each gap 50. The filler portion 56 functions as a wedge which serves to affix the corresponding external electrode 54 tightly to the corresponding end face 52a, 52b of the laminar body 48, while providing an increased area of contact between the external electrode 54 and the end face 52a, 52b. As a result, the adhesiveness of the external electrodes 54, 54 to the respective opposite end faces 52a, 52b is advantageously increased.

Further, the filler portion 56 formed in the gap 50 between the auxiliary vapor-deposition metal film 24 and the resin film 12 integrally adheres to the auxiliary vapor-deposition metal film 24. Thus, the external electrode 54 and the thick edge portion 26 of the vapor-deposition metal film 14 are stably connected electrically. Consequently, in the plurality of film capacitor elements 10 which constitute the laminar body 48, the second film portions 22 of the vapor-deposition metal films 14 are alternately connected to one and the other of the pair of external electrodes 54, 54.

A laminar film capacitor 58 can be obtained by laminating or superposing a plurality of film capacitor elements 10 on each other, as described above. Reference numeral 59 in FIG. 4 denotes a protective film. In the film capacitor 58, terminals not shown may be connected to the external electrodes 54, 54, as needed.

Figure 5:
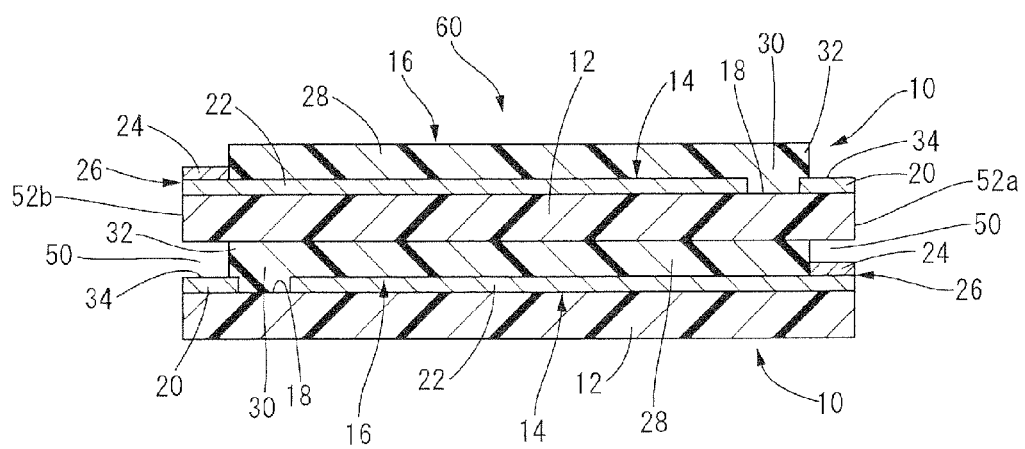
FIG. 5 is a view showing one example of a process of producing a wound type film capacitor by using the film capacitor elements each shown in FIG. 1.

In the production of a wound type film capacitor using the film capacitor element 10, two film capacitor elements 10 are initially laminated to obtain a laminar body 60 as shown in FIG. 5.

In the production of the laminar body 60, the two film capacitor elements 10 are laminated in the same manner, as in the production of the laminar body 48 which constitutes the laminar film capacitor 58. Namely, the two film capacitor elements 10 are laminated or superposed on each other such that the vapor-deposition polymer film 16 of a lower one of the two adjacent film capacitor elements 10 and the resin film 12 of an upper one of the two adjacent film capacitor elements 10 contact with each other, and such that the margin portions 18 of the two adjacent film capacitor elements 10 are positioned at respective opposite positions as seen in the width direction of the resin film 12. In the laminar body 60, as in the production of the laminar body 48, the gaps 50 are formed between the two film capacitor elements 10, 10 such that the gaps 50 are open laterally outwardly at the opposite end faces 52a, 52b.

Figure 6:
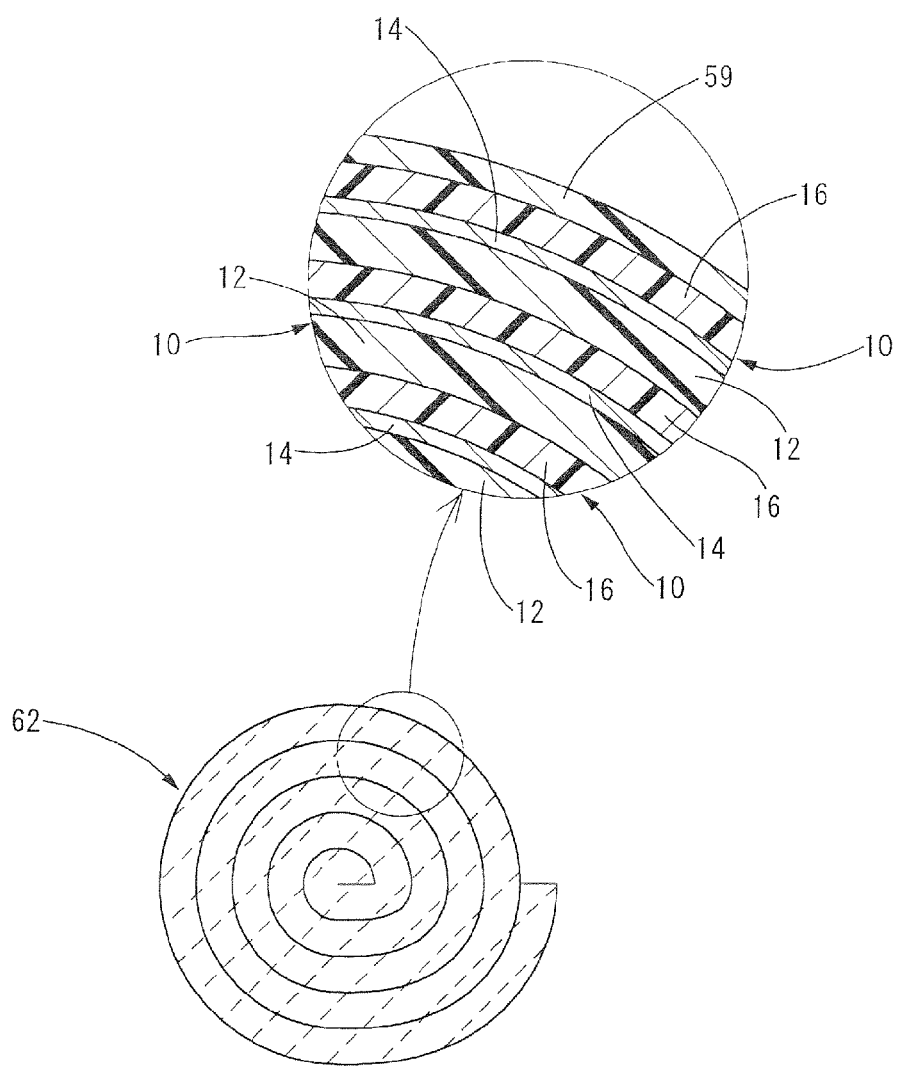
FIG. 6 is a view schematically showing the wound type film capacitor according to the present invention produced by using the film capacitor elements shown in FIG. 1.

As shown in FIG. 6, a wound body 62 is then obtained by winding the laminar body 60 by one turn or a plurality of turns such that the resin film 12 of the lower one of the two film capacitor elements 10 constituting the laminar body 60 is positioned radially inwardly of the other upper film capacitor element 10. External electrodes 54 not shown in FIG. 6 are formed at respective opposite end faces of the wound body 62 (which are respectively constituted by the two end faces 52a, 52b of the laminar body 60), by performing thermal spraying of a metal material such as zinc. Thus, the intended wound type film capacitor 58 is obtained. In the film capacitor 58, terminals may be connected to the pair of external electrodes 54, 54, as needed.

The thus obtained wound type film capacitor 58 has a transverse cross sectional form similar to that of the laminar film capacitor 58 shown in FIG. 4. In the wound type film capacitor 58, a part of each external electrode 54 extends into the gap 50 provided at each end face of the laminar body 60 (corresponding to the laminar body 48 in FIG. 4), and forms the filler portion 56. Thus, the adhesiveness of the external electrodes 54, 54 to the respective end faces 52a, 52b is advantageously improved, allowing the external electrodes 54 to be stably connected electrically to the thick edge portion 26 of the vapor-deposition metal film 14.

It will be understood from the foregoing description that the film capacitor element 10 of the present embodiment is configured such that the second covering portion 30 consisting of a part of the vapor-deposition polymer film 16 is formed so as to cover entire area of the end face of the second film portion 22 on the side of the margin portion 18, and a corner edge defined by the end face and the surface of the second film portion 22 on which the first covering portion 28 is formed. As a result, the second film portion 22, which is in contact with the corresponding external electrode 54 formed on one end face of the film capacitor element 10 and functions as the internal electrode, can be stably prevented from contacting the other external electrode 54 that is formed on the other end face of the film capacitor element 10.

Further, the laminar bodies 48, 60 which are obtained by laminating the plurality of film capacitor elements 10 have the plurality of gaps 50 at the two end faces 52a, 52b. During the production of the film capacitor 58, the filler portions 56 are formed in the respective gaps 50 by respective parts of the external electrodes 54, 54, which are formed by thermal spraying so as to cover the respective end faces 52a, 52b, so that the adhesiveness of the external electrodes 54, 54 to the two end faces 52a, 52b is advantageously increased. Therefore, the external electrodes 54, 54 are effectively prevented from separating from the film capacitor 58, which is obtained by using the film capacitor elements 10. As a result, the film capacitor 58 can be stably used in a good condition for a longer period of time.

The film capacitor element 10 of the present embodiment is further configured such that the first film portion 20 is formed on the end portion of the resin film 12 on the side of the margin portion, which is remote from the second film portion 22. During the production of the film capacitor 58, the gap 50 is provided above the non-covered portion 34 of each first film portion 20, on which the vapor-deposition polymer film is not formed. A portion of the external electrode 54 extends into the gap 50 so as to form the filler portion 56. Accordingly, it is not required to provide the margin portion 18 so as to have an unnecessarily large width in order to increase the adhesiveness of the external electrodes 54, 54 to the respective end faces 52a, 52b of the film capacitor 58. Therefore, the amount of oil required for forming the margin portion 18 can be minimized, thereby effectively preventing various defects due to an increase of the amount of oil to be used.

The present embodiment is further configured such that the vapor-deposition polymer film 16 includes the third covering portion 32, which is formed on the end portion of the first film portion 20 on the side of the margin portion 18, thereby preventing an unnecessarily large width of the non-covered portion 34. Accordingly, the provision of the third covering portion 32 makes it possible to advantageously prevent formation of an undesirably large area of flexure of the end portion of the first film portion 20 (which is not covered by the vapor-deposition polymer film 16), for example, when the laminar body 60 consisting of the two film capacitor elements 10, 10 is wound to obtain the wound body 62, during the production of the wound type film capacitor 58.

Further embodiments of the film capacitor element according to the present invention will be described in detail. Film capacitor elements 64, 66, 68, which are shown in FIGS. 7-12 and described bellow, have structures similar to that of the film capacitor element 10 shown in FIGS. 1-6 except in the laminar structure of the vapor-deposition metal film 14 and the vapor-deposition polymer film 16 formed on the resin film 12. Therefore, the same reference signs as used in FIGS. 1-6 will be used in FIGS. 7-12 to denote members and portions of the film capacitor elements 64, 66, 68, which are similar in structure to the corresponding members and portions of the film capacitor element 10 shown in FIGS. 1-6, and detailed description of which will be omitted.

Figure 7:
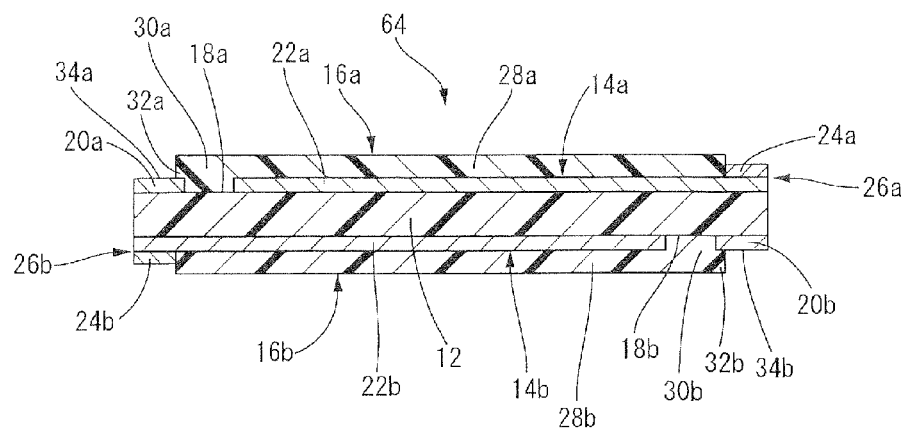
FIG. 7 is a view corresponding to that of FIG. 1, showing another embodiment of the film capacitor element according to the present invention.

In the film capacitor element 64 shown in FIG. 7, a vapor-deposition metal film 14*a* and a vapor-deposition polymer film 16*a* are laminated in this order on one of opposite major surfaces of the resin film 12 in the thickness direction, while a vapor-deposition metal film 14*b* and a vapor-deposition polymer film 16*b* are laminated in this order on the other one of the opposite major surfaces of the resin film 12. Namely, in the film capacitor element 64 of the present embodiment, the resin film 12, the vapor-deposition metal film 14*a* and the vapor-deposition polymer film 16*a* constitute a basic structure consisting of a base dielectric film layer (resin film 12), a vapor-deposition metal film layer (vapor-deposition metal film 14*a*) and a dielectric covering film layer (vapor-deposition polymer film 16*a*) which are laminated or superposed on each other in this order. Also, the resin film 12, the vapor-deposition metal film 14*b* and the vapor-deposition polymer film 16*b* constitute another basic structure consisting of a base dielectric film layer (resin film 12), a vapor-deposition metal film layer (vapor-deposition metal film 14*b*) and a dielectric covering film layer (vapor-deposition polymer film 16*b*) which are laminated or superposed on each other in this order.

In the film capacitor element 64, margin portions 18*a*, 18*b*, which are formed on respective opposite major surfaces of the resin film 12 are positioned on respective opposite sides of the resin film 12 as seen in the width direction (horizontal direction in FIG. 7). Namely, the margin portion 18*a* is formed on one of the opposite major surfaces of the resin film 12, at a position spaced from the center to one end face of the resin film 12, while the margin portion 18*b* is formed on the other of the opposite major surfaces of the resin film 12, at a position spaced from the center to the other end face of the resin film 12.

Accordingly, a first film portion 20*a* of the vapor-deposition metal film 14*a*, which is formed on one of the opposite major surfaces of the resin film 12, and a first film portion 20*b* of the vapor-deposition metal film 14*b*, which is formed on the other of the opposite major surfaces of the resin film 12, are positioned on the respective opposite sides of the resin film 12 as seen in the width direction. Similarly, non-covered portions 34*a*, 34*b*, which are respectively formed on the two first film portions 20*a*, 20*b*, auxiliary vapor-deposition metal films 24*a*, 24*b*, which are respectively formed on two second film portions 22*a*, 22*b* formed on the respective opposite major surfaces of the resin film 12, and thick edge portions 26*a*, 26*b* of the vapor-deposition metal films 14*a*, 14*b* are all positioned on the respective opposite sides of the resin film 12 as seen in the width direction.

Figure 8:
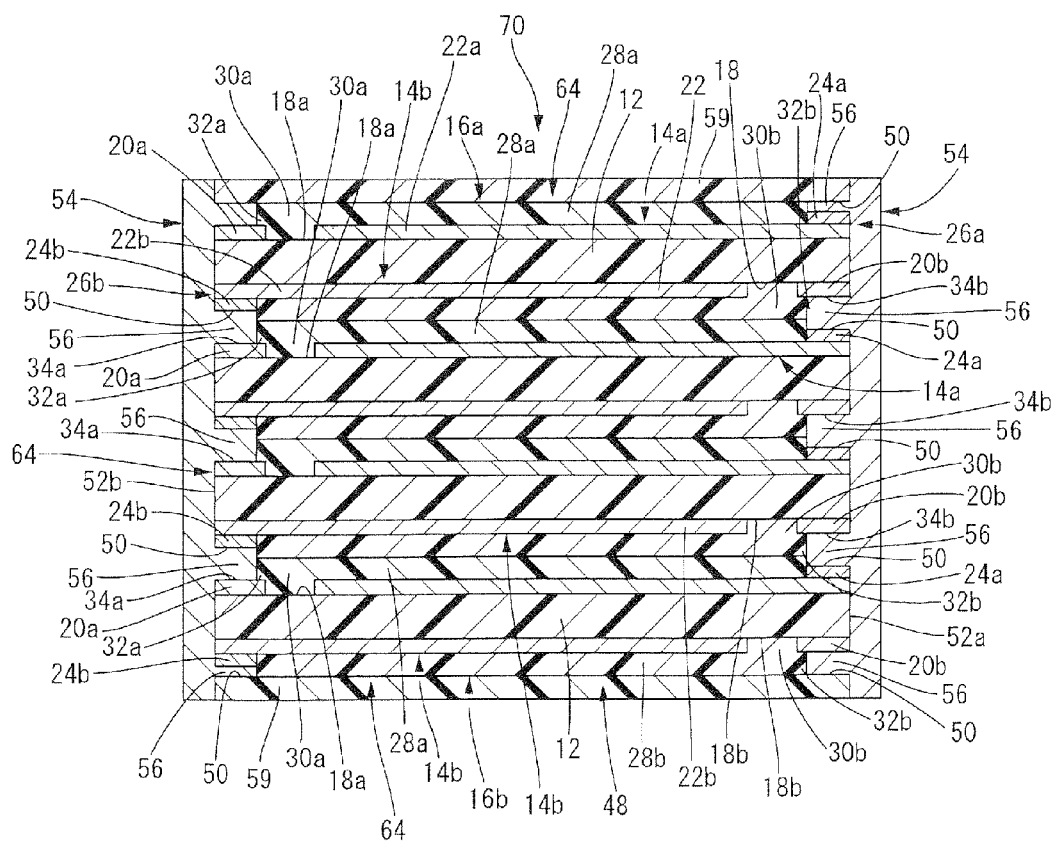
FIG. 8 is a schematic transverse cross sectional view showing a laminar film capacitor according to the present invention produced by using the film capacitor elements each shown in FIG. 7.

In order to produce a laminar film capacitor 70 as shown in FIG. 8, by using a plurality (four in this embodiment) of film capacitor elements 64 each having the above-described structure, the laminar body 48 consisting of the plurality of film capacitor elements 64 laminated on each other is used. In the laminar body 48, two adjacent ones of the film capacitor elements 64, 64 are superposed on each other such that the vapor-deposition polymer films 16*b* and 16*a* contact with each other, and such that the margin portions 18*a*, 18*b* are positioned on the respective opposite sides of the resin film 12 as seen in the width direction. Further, at two respective opposite end faces 52*a*, 52*b* of the laminar body 48, there are formed a plurality of gaps 50 which are open at the respective end faces. The two end faces 52*a*, 52*b* of the laminar body 48 are coated, by thermal spraying, with a metal material such as zinc to form a pair of external electrodes 54, 54, thereby producing the film capacitor 70.

In the thus obtained film capacitor 70, a part of each external electrode 54 extends into the corresponding one of the plurality of gaps 50 open at the two opposite end faces 52*a*, 52*b* of the laminar body 48, to form the filler portion 56. Thus, the adhesiveness of the pair of external electrodes 54, 54 to the two end faces 52*a*, 52*b* is increased, and each external electrode 54 is fixed in tight contact with the corresponding one of the thick edge portions 26*a*, 26*b* of the second film portions 22*a*, 22*b*.

Therefore, the film capacitor element 64 of the present embodiment has the same functions and effects as those in the above-described first embodiment.

Particularly, the film capacitor 70 obtained by using the film capacitor element 64 of the present embodiment is configured such that the vapor-deposition polymer films 16*a*, 16*b* having a smaller thickness than the resin film 12 are placed between the two adjacent vapor-deposition metal films 14*a*, 14*b*. Therefore, the film capacitor 70 can advantageously have a higher electric potential gradient and an improved withstand voltage characteristic.

The film capacitor element 64 of the present embodiment is also configured such that the vapor-deposition metal films 14*a*, 14*b* and the vapor-deposition polymer films 16*a*, 16*b* are formed on the respective opposite major surfaces of the resin film 12. Accordingly, a wound type film capacitor can be produced by winding only one film capacitor element 64, rather than by laminating a plurality of film capacitor elements 64. Therefore, it is possible to effectively prevent various defects, which would be caused due to an error of positioning of the plurality of film capacitor elements 64 in the width direction upon lamination of the film capacitor elements 64 to obtain the wound type film capacitor.

Figure 9:
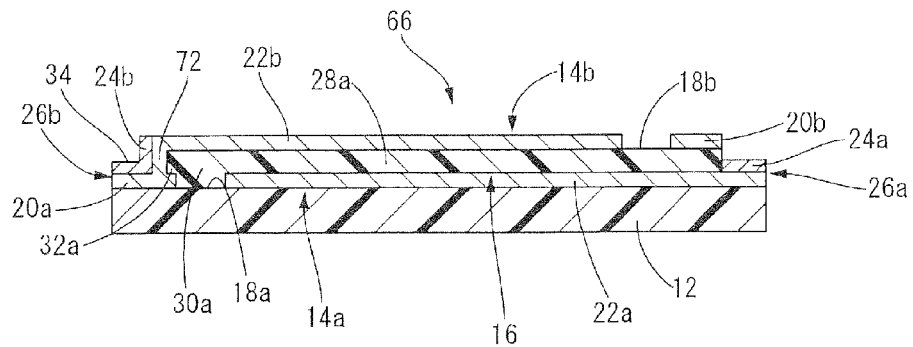
FIG. 9 is a view corresponding to that of FIG. 1, showing a further embodiment of the film capacitor element according to the present invention.

In the film capacitor element 66 shown in FIG. 9, two vapor-deposition metal films 14*a*, 14*b* and a vapor-deposition polymer film 16 are alternately laminated on one of opposite major surfaces of the resin film 12. Namely, in the film capacitor element 66 of the present embodiment, the resin film 12, the vapor-deposition metal film 14*a*, and the vapor-deposition polymer film 16 constitute a basic structure consisting of a base dielectric film layer (resin film 12), a vapor-deposition metal film layer (vapor-deposition metal film 14*a*) and a dielectric covering film layer (vapor-deposition polymer film 16) which are laminated or superposed on each other in this order. Also, the vapor-deposition metal film 14b formed on the vapor-deposition polymer film 16 as the dielectric covering film layer constitutes an upper vapor-deposition metal film layer.

In the film capacitor element 66 of the present embodiment, the margin portion 18a is formed in one widthwise end portion (left end portion as seen in FIG. 9) of the resin film 12 while the margin portion 18b is formed as an upper margin portion in the other widthwise end portion (right end portion as seen in FIG. 9) of the vapor-deposition polymer film 16. A portion of the vapor-deposition metal film 14b which is positioned on the right side of the margin portion 18b as seen in FIG. 9 (remote from the margin portion 18a formed on the resin film 12) is defined as a first film portion 20b (first upper film portion), and another portion of the vapor-deposition metal film 14b which is positioned on the left side of the margin portion 18b as seen in FIG. 9 is defined as a second film portion 22b (second upper film portion).

The vapor-deposition metal film 14b, which is formed on the vapor-deposition polymer film 16, is connected to the first film portion 20a of the vapor-deposition metal film 14a by a connecting portion 72 which extends from an end portion of the vapor-deposition metal film 14b remote from the margin portion 18b, in the direction of thickness of the vapor-deposition metal film 14b formed on the vapor-deposition polymer film 16. An auxiliary vapor-deposition metal film 24a is formed on an end portion of the second film portion 22a of the vapor-deposition metal film 14a remote from the margin portion 18a, while an auxiliary vapor-deposition metal film 24b is formed so as to cover the first film portion 20a of the vapor-deposition metal film 14a, and the connecting portion 72 extending from the second film portion 22b of the vapor-deposition metal film 14b. Further, a non-covered portion 34 is formed on the auxiliary vapor-deposition metal film 24b formed on the first film portion 20a of the vapor-deposition metal film 14a. The first film portion 20a of the vapor-deposition metal film 14a and the vapor-deposition metal film 14b may not be connected to each other (may not be in contact with each other). Namely, it is possible to eliminate the connecting portion 72 and also possible to eliminate the auxiliary vapor-deposition metal film 24b which covers the first film portion 20a and the connecting portion 72.

Figure 10:
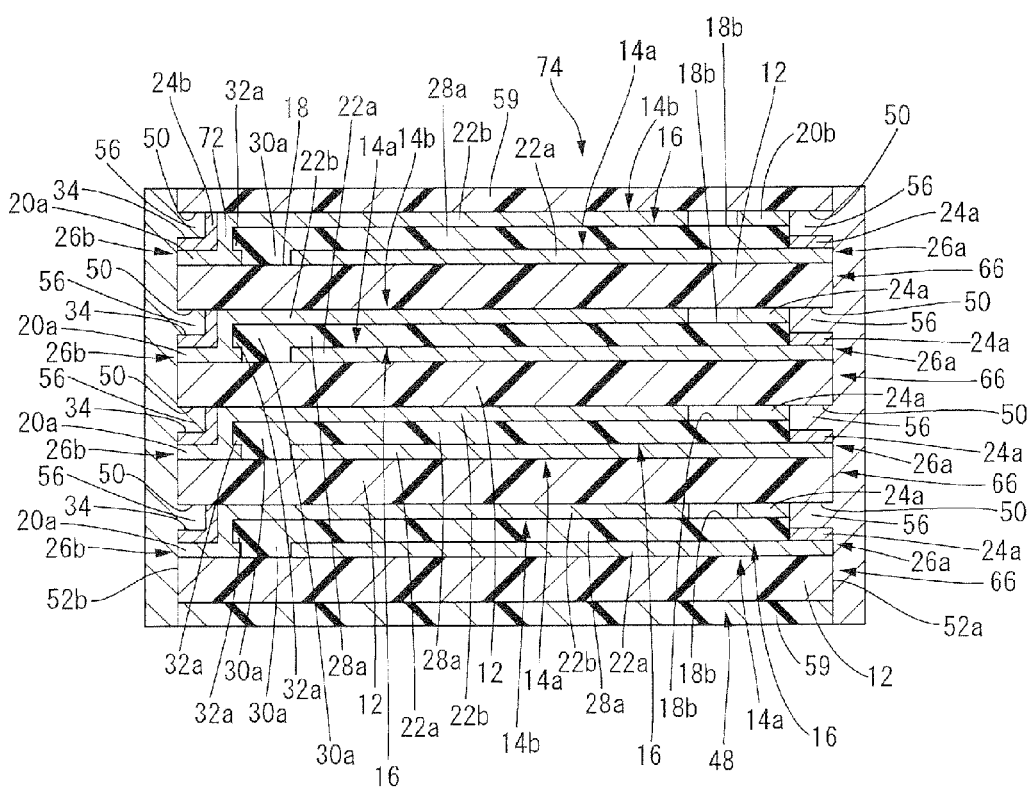
FIG. 10 is a schematic transverse cross sectional view showing a laminar film capacitor according to the present invention produced by using the film capacitor elements each shown in FIG. 9.

In order to produce a laminar film capacitor 74 shown in FIG. 10, by using a plurality (four in this embodiment) of film capacitor elements 66 each having the above-described structure, the laminar body 48 consisting of the plurality of film capacitor elements 66 laminated on each other is used. In the laminar body 48, two adjacent ones of the film capacitor elements 66, 66 are laminated or superposed on each other such that the resin film 12 and the vapor-deposition metal film 14b contact with each other, and such that the margin portions 18a, 18b are positioned on the respective opposite sides of the resin film 12 as seen in the width direction. At the two respective opposite end faces 52a, 52b of the laminar body 48, there are formed a plurality of gaps 50, which are open laterally outwardly at the respective opposite end faces.

The two opposite end faces 52a, 52b of the laminar body 48 are coated, by thermal spraying, with a metal material such as zinc to form a pair of external electrodes 54, 54, thereby producing the film capacitor 74. In the thus obtained film capacitor 74, a part of each external electrode 54 extends into the corresponding one of the plurality of gaps 50 open at the two opposite end faces 52a, 52b of the laminar body 48, thereby forming the filler portion 56.

Therefore, the film capacitor element 66 of the present embodiment has the same functions and effects as those in the above-described first and second embodiments.

Particularly, the film capacitor 74 obtained by using the film capacitor element 66 of the present embodiment has a basic structure wherein the vapor-deposition polymer film 16 is interposed between the two vapor-deposition metal films 14a, 14b. Therefore, the film capacitor 74 can have a smaller size and a higher capacity than film capacitors which have basic structures wherein the resin film 12 and the vapor-deposition polymer film 16, or the resin film 12, or the two vapor-deposition polymer films 16a, 16b are interposed between the two vapor-deposition metal films 14a, 14b.

Figure 11:
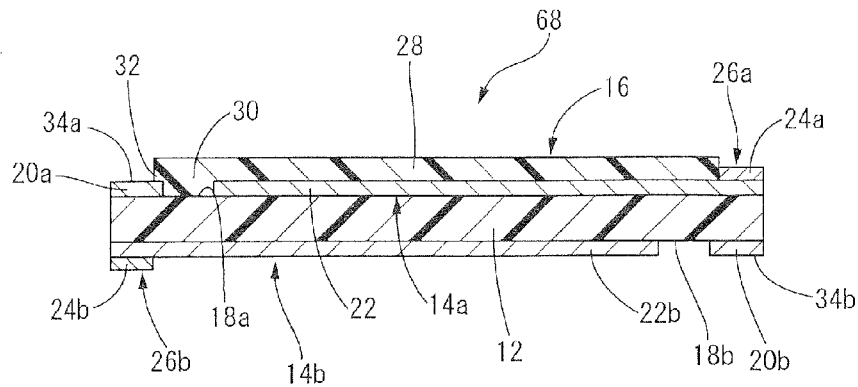
FIG. 11 is a view corresponding to that of FIG. 1, showing a still further embodiment of the film capacitor element according to the present invention.

In the film capacitor element 68 shown in FIG. 11, the vapor-deposition metal film 14a and the vapor-deposition polymer film 16 are formed on one of the opposite major surfaces of the resin film 12, while only the vapor-deposition metal film 14b is formed as a lower vapor-deposition metal film layer on the other of the opposite major surfaces of the resin film 12. Also, the margin portion 18b is formed as a lower margin portion on the other major surface of the resin film 12 on which the vapor-deposition metal film 14b is formed. The margin portion 18b is formed in an end portion of the other major surface of the resin film 12 such that the margin portion 18a and the margin portion 18b are positioned on the respective opposite sides of the resin film 12 as seen in the width direction. Namely, in the film capacitor element 68 of the present embodiment, the resin film 12, the vapor-deposition metal film 14a and the vapor-deposition polymer film 16 constitute a basic structure consisting of a base dielectric film layer (resin film 12), a vapor-deposition metal film layer (vapor-deposition metal film 14a) and a dielectric covering film layer (vapor-deposition polymer film 16) which are laminated or superposed on each other in this order. In other words, the film capacitor element 68 has a structure which does not include the vapor-deposition polymer film 16b provided in the film capacitor element 64 shown in FIG. 7. A portion of the vapor-deposition metal film 14b which is positioned on the right side of the margin portion 18b as seen in FIG. 11 (remote from the margin portion 18a formed on the resin film 12) is defined as a first film portion 20b (first lower film portion), and another portion of the vapor-deposition metal film 14b which is positioned on the left side of the margin portion 18b as seen in FIG. 11 is defined as a second film portion 22b (second lower film portion).

Figure 12:
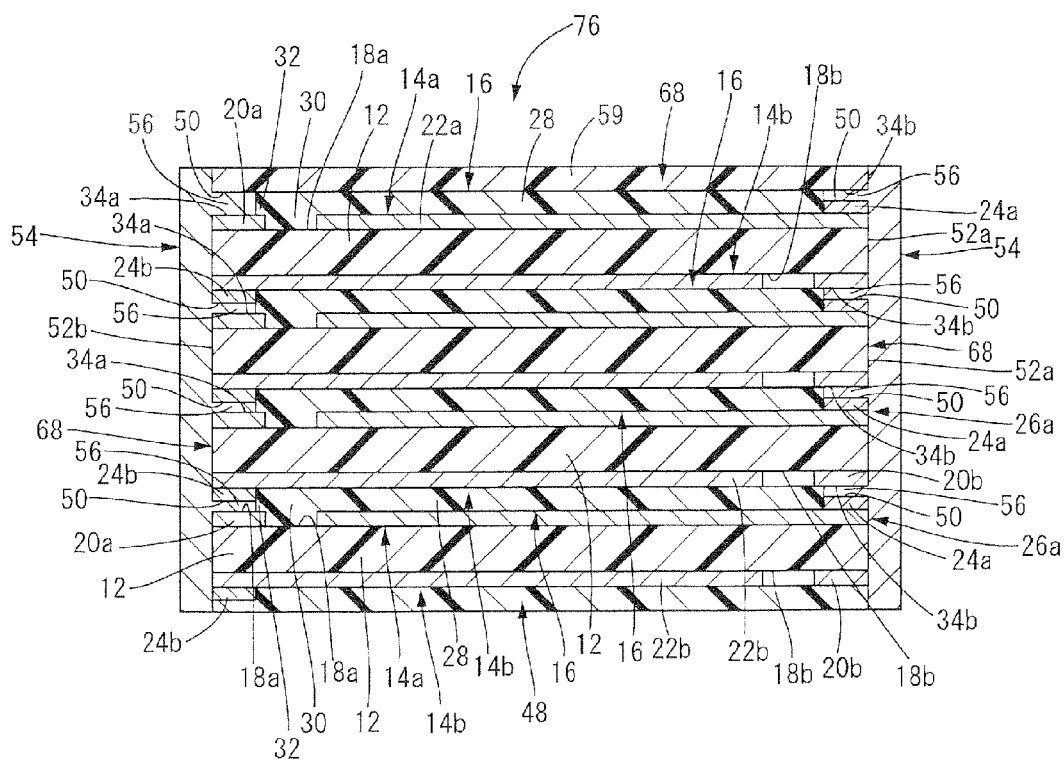
FIG. 12 is a schematic transverse cross sectional view showing a laminar film capacitor according to the present invention produced by using the film capacitor elements each shown in FIG. 11.

In order to produce a laminar film capacitor 76 shown in FIG. 12, by using a plurality (four in this embodiment) of film capacitor elements 68 each having the above-described structure, the laminar body 48 consisting of the plurality of film capacitor elements 68 laminated on each other is used. In the laminar body 48, two adjacent ones of the film capacitor elements 68, 68 are laminated or superposed on each other such that the vapor-deposition metal film 14b and the vapor-deposition polymer film 16 contact with each other, and such that the margin portions 18a, 18b are positioned on the respective opposite sides of the resin film 12 in the width direction. At the two respective opposite end faces 52a, 52b of the laminar body 48, there are formed a plurality of gaps 50 which are open laterally outwardly at the respective end faces.

The two opposite end faces 52a, 52b of the laminar body 48 are coated, by thermal spraying, with a metal material such as zinc to form a pair of external electrodes 54, 54, thereby producing the film capacitor 76. In the thus obtained film capacitor 76, a part of each external electrode 54 extends into corresponding one of the plurality of gaps 50 open at the two opposite end faces 52a, 52b of the laminar body 48, thereby forming the filler portion 56.

Therefore, the film capacitor element 68 of the present embodiment has the same functions and effects as those in the above-described first embodiment.

Particularly, the film capacitor 76 obtained by using the film capacitor element 68 of the present embodiment has a basic structure wherein only the vapor-deposition polymer film 16a is interposed between the two vapor-deposition metal films 14a, 14b, and a basic structure wherein only the resin film 12 is interposed between the two vapor-deposition metal films 14a, 14b. Therefore, the film capacitor 76 can be small-sized owing to the use of the film capacitor element 68.

While the specific embodiments of the present invention have been described in detail, for illustrative purpose only, it is to be understood that the present invention is not limited to the details of the illustrated embodiments.

For example, the base dielectric film layer may be constituted by a vapor-deposition polymer film or a dielectric coating film layer, in place of the resin film 12. The dielectric coating film layer is obtained by coating a vapor-deposition metal film layer with polypropylene, polyethylene terephthalate, polycarbonate or polyphenylene sulfide.

Further, the dielectric covering film layer may be constituted by the dielectric coating film layer described above, in place of the vapor-deposition polymer film 16.

Further, of the first, second and third covering portions 28, 30 and 32 of the vapor-deposition polymer film 16, the third covering portion 32 formed on the first film portion 20 may be eliminated. The third covering portion 32 may be eliminated even where the dielectric covering film layer is constituted by the dielectric coating film layer described above.

While the vapor-deposition polymer film 16 in the illustrated first embodiment has a laminar structure consisting of two film layers, the vapor-deposition polymer film 16 may consist of a single film layer. The production apparatus 36 used to produce the film capacitor element 10 having this vapor-deposition polymer film 16 consisting of the single film layer is provided with only one polymer film forming device. Alternatively, the vapor-deposition polymer film 16 may consist of three or more film layers. The production apparatus 36 used to produce the film capacitor element 10 having the vapor-deposition polymer film 16 consisting of the three or more film layers is provided with three or more polymer film forming devices.

It will be understood that the present invention may be embodied with various other changes, modifications and improvements (not illustrated herein), which may occur to those skilled in the art, without departing from the spirit of the invention.

What is claimed is:

1. A film capacitor element comprising a base dielectric film layer, a vapor-deposition metal film layer formed on at least one of opposite major surfaces of the base dielectric film layer, and a dielectric covering film layer formed integrally on the vapor-deposition metal film layer, by vapor-deposition polymerization or coating, characterized in that:
   a margin portion in which the vapor-deposition metal film layer is not formed is provided in a part of an end portion of the major surface of the base dielectric film layer, which part is spaced inwardly from an end face of the base dielectric film layer, the margin portion extending along the end face and dividing the vapor-deposition metal film layer into a first film portion and a second film portion such that the first and second film portions are positioned on respective opposite sides of the margin portion, the first film portion extending along the end face of the base dielectric film layer, while the second film portion being spaced apart from the first film portion by the margin portion;
   the dielectric covering film layer is integrally formed on the second film portion and in the margin portion, by vapor-deposition polymerization or coating, and includes a covering portion which fills the margin portion and covers an entire area of an end face of the second film portion on the side of the margin portion; and
   the first film portion includes a first non-covered portion which is not covered by the dielectric covering film layer.

2. The film capacitor element according to claim 1, wherein the vapor-deposition metal film layer and the dielectric covering film layer are laminated on each of the opposite major surfaces of the base dielectric film layer such that the margin portion is provided in one of opposite end portions of one of the opposite major surfaces of the base dielectric film layer, and in one of opposite end portions of the other of the opposite major surfaces, which one end portion of the other major surface corresponds to the other of the opposite end portions of the one major surface, and such that the covering portion of the dielectric covering film layer provided on each of the opposite major surfaces of the base dielectric film layer fills the margin portion provided on each of the opposite major surfaces, the first film portion of the vapor-deposition metal film layer being formed on the one of the opposite end portions of the one major surface of the base dielectric film layer, and on the one of the opposite end portions of the other major surface, such that the first film portions formed on the opposite major surfaces extend along the respective opposite end faces of the base dielectric film layer, each of the first film portions including the first non-covered portion.

3. The film capacitor element according to claim 1, further comprising:
   an upper vapor-deposition metal film layer formed on the dielectric covering film layer in addition to the vapor-deposition metal film layer formed on one of said opposite major surfaces of the base dielectric film layer, such that the upper vapor-deposition metal film layer does not contact with the second film portion of the vapor-deposition metal film layer; and
   an upper margin portion in which the upper vapor-deposition metal film layer is not formed, and which is provided in a part of an end portion of the dielectric covering film layer, which end portion is remote from the covering portion, and which part is spaced inwardly from an end face of the dielectric covering film layer, the upper margin portion extending along the end face and dividing the upper vapor-deposition metal film layer into a first upper film portion and a second upper film portion, such that the first and second upper film portions are positioned on respective opposite sides of the upper margin portion, the first upper film portion extending along the end face of the dielectric covering film layer, while the second upper film portion being spaced apart from the first upper film portion by the upper margin portion.

4. The film capacitor element according to claim 1, wherein the vapor-deposition metal film layer and the dielectric covering film layer are laminated on one of the opposite major surfaces of the base dielectric film layer, while a lower vapor-deposition metal film layer is formed on the other of the opposite major surfaces of the base dielectric film layer in addition to the vapor-deposition metal film layer formed on one of said opposite major surfaces of the base dielectric film layer, such that the lower vapor-deposition metal film layer does not contact with the vapor-deposition metal film layer, and wherein a lower margin portion in which the lower vapor-deposition metal film layer is not formed is provided in a part of one of opposite end portions of the other major surface of the base dielectric film layer, which one end portion corresponds to one end portion of the one major surface of the base dielectric layer remote from the margin portion, and which part is spaced inwardly from an end face of the base dielectric film layer, the lower margin portion extending along the end face and dividing the lower vapor-deposition metal film layer into a first lower film portion and a second lower film portion, such that the first and second lower film portions are positioned on respective opposite sides of the lower margin portion, the first lower film portion extending along the end face of the base dielectric film layer, while the second lower film portion being spaced apart from the first lower film portion by the lower margin portion.

5. The film capacitor element according to claim 1, wherein the second film portion includes a second non-covered portion in one of opposite end portions thereof which is remote from the margin portion, the second non-covered portion being not covered by the dielectric covering film layer.

6. The film capacitor element according to claim 5, wherein the second non-covered portion of the second film portion is defined as a thick edge portion having a larger thickness than a portion of the second film portion other than the second non-covered portion.

7. The film capacitor element according to claim 6, wherein an auxiliary vapor-deposition metal film layer is formed on the second non-covered portion of the second film portion such that the second non-covered portion is defined as said thick edge portion.

8. The film capacitor element according to claim 1, wherein the dielectric covering film layer is formed on an end portion of the first film portion on the side of the margin portion so as to cover the end portion, whereby a covered portion which is covered by the dielectric covering film layer is provided on the end portion of the first film portion.

9. The film capacitor element according to claim 1, wherein the dielectric covering film layer has a higher relative dielectric constant than the base dielectric film layer.

10. The film capacitor element according to claim 1, wherein the dielectric covering film layer comprises a vapor-deposition polymer film layer formed of a polyurea resin.

11. The film capacitor element according to claim 1, wherein the dielectric covering film layer is formed on the second film portion and in the margin portion so as to have a laminar structure consisting of a plurality of vapor-deposition polymer films formed of the same kind of material.

12. A film capacitor comprising a laminar or wound body obtained by using film capacitor elements as defined in claim 1, and two external electrodes formed on respective opposite end faces of the laminar or wound body, and wherein a gap is formed between the non-covered portion of the first film portion of the vapor-deposition metal film layer of one of two adjacent ones of the film capacitor elements, and an end portion of the other of the two adjacent film capacitor elements, which end portion is opposed to the non-covered portion, a portion of each of the two external electrodes functioning as a filler portion which fills the gap.

* * * * *